United States Patent
Lee et al.

(10) Patent No.: US 6,905,302 B2
(45) Date of Patent: Jun. 14, 2005

(54) NETWORK COOLED COATED WALL (75) Inventors: Ching-Pang Lee, Cincinnati, OH (US); Ramgopal Darolia, West Chester, OH (US)

(73) Assignee: General Electric Company, Schenectady, NY (US)

( * ) Notice: Subject to any disclaimer, the term of this patent is extended or adjusted under 35 U.S.C. 154(b) by 26 days.

(21) Appl. No.: 10/664,192

(22) Filed: Sep. 17, 2003

(65) Prior Publication Data
US 2005/0058534 A1 Mar. 17, 2005

(51) Int. Cl.[7] .................................................. F01D 5/14
(52) U.S. Cl. .................... 415/115; 415/116; 415/173.1; 415/173.4; 415/200; 415/178
(58) Field of Search ............................. 415/115, 116, 415/173.1, 173.4, 200, 176, 178; 428/596, 597, 621, 632, 131, 133, 937

(56) References Cited

U.S. PATENT DOCUMENTS

| | | | |
|---|---|---|---|
| 4,679,981 A | * | 7/1987 | Guibert et al. .............. 415/116 |
| 5,098,257 A | * | 3/1992 | Hultgren et al. ............ 415/115 |
| 5,375,973 A | * | 12/1994 | Sloop et al. ............. 415/173.1 |
| 5,584,651 A | | 12/1996 | Pietraszkiewicz et al. |
| 5,941,686 A | | 8/1999 | Gupta et al. |
| 6,155,778 A | | 12/2000 | Lee et al. |
| 6,196,792 B1 | | 3/2001 | Lee et al. |
| 6,241,469 B1 | * | 6/2001 | Beeck et al. ................. 415/115 |
| 6,511,762 B1 | | 1/2003 | Lee et al. |
| 6,617,003 B1 | * | 9/2003 | Lee et al. .................... 428/131 |

* cited by examiner

Primary Examiner—Edward K. Look
Assistant Examiner—Igor Kershteyn
(74) Attorney, Agent, or Firm—William S. Andes; Francis L. Conte (57) ABSTRACT A turbine wall includes a metal substrate having front and back surfaces. A thermal barrier coating is bonded atop the front surface. A network of flow channels is laminated between the substrate and the coating for carrying an air coolant therebetween for cooling the thermal barrier coating.

27 Claims, 5 Drawing Sheets

NETWORK COOLED COATED WALL

BACKGROUND OF THE INVENTION

The present invention relates generally to gas turbine engines, and, more specifically, to component cooling therein.

In a gas turbine engine, air is pressurized in a compressor and mixed with fuel for generating hot combustion gases in a combustor. Energy is extracted from the combustion gases in a high pressure turbine for powering the compressor, and additional energy is extracted in a low pressure turbine which powers a fan in a turbofan aircraft engine application, or drives an output shaft for marine and industrial applications.

Engine efficiency may be maximized by maximizing the temperature of the combustion gases from which energy is extracted. However, the combustion gases must be contained in the engine by various components which are therefore subject to heating therefrom.

Typical components exposed to the hot combustion gases include the liners of the combustor, the vanes and bands of turbine nozzles, and rotor blades and their surrounding turbine shrouds, for example. These hot components are typically made of state-of-the-art high strength superalloy materials, typically nickel or cobalt based for gas turbine engine applications. These superalloys are expensive, but maximize the high temperature strength of the hot components for achieving the desired long useful life thereof for reducing maintenance operations and corresponding costs.

In conjunction with the superalloy composition of these hot engine components, cooling air bled from the compressor is also used for providing cooling during operation. Various configurations of cooling apertures and channels are provided in these hot components for suitably channeling the pressurized air coolant therethrough for providing internal cooling. The spent cooling air is typically discharged from film cooling holes extending through the inboard or exposed surfaces of the components directly facing the hot combustion gases for providing a thermally insulating cooling air film layer between the component and the hot combustion gases.

These hot components may also be further protected by providing thereon thermal barrier coatings (TBC) which are typically ceramic materials providing additional thermal insulation between the metal substrates of the components and the hot combustion gases.

Thermal barrier coatings are typically applied to the metallic substrates atop a metallic bond coat therebetween, although thermal barrier coatings without bond coats are being developed. The bond coat provides a bonding interface layer for improving the bond of the ceramic thermal barrier coating atop the substrate, and additionally provides oxidation resistance.

The proper operation of the thermal barrier coating requires heat conduction through the coating, through the bond coat, and through the metallic substrate into the cooling circuits which extract heat therefrom. Not only does the metallic substrate have maximum temperature operating limits, but the bond coat and thermal barrier coating also have their respective maximum temperature limits which should not be exceeded for ensuring the desired useful life thereof.

However, the performance of superalloy metallic substrates, and the various forms of conventional thermal barrier coatings and their corresponding bond coats is nevertheless limited by the ability of the air coolant to cool these materials for maintaining them below their maximum operating temperatures. Although the spent cooling air is additionally used in the cooling film for thermally insulating and protecting the thermal barrier coating itself, the thermal barrier coating necessarily requires cooling itself which occurs through conduction to the underlying bond coat and metallic substrate.

Accordingly, it is desired to provide improved cooling of the thermal barrier coating itself when applied atop the metallic substrate.

BRIEF DESCRIPTION OF THE INVENTION

A turbine wall includes a metal substrate having front and back surfaces. A thermal barrier coating is bonded atop the front surface. A network of flow channels is laminated between the substrate and the coating for carrying an air coolant therebetween for cooling the thermal barrier coating.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
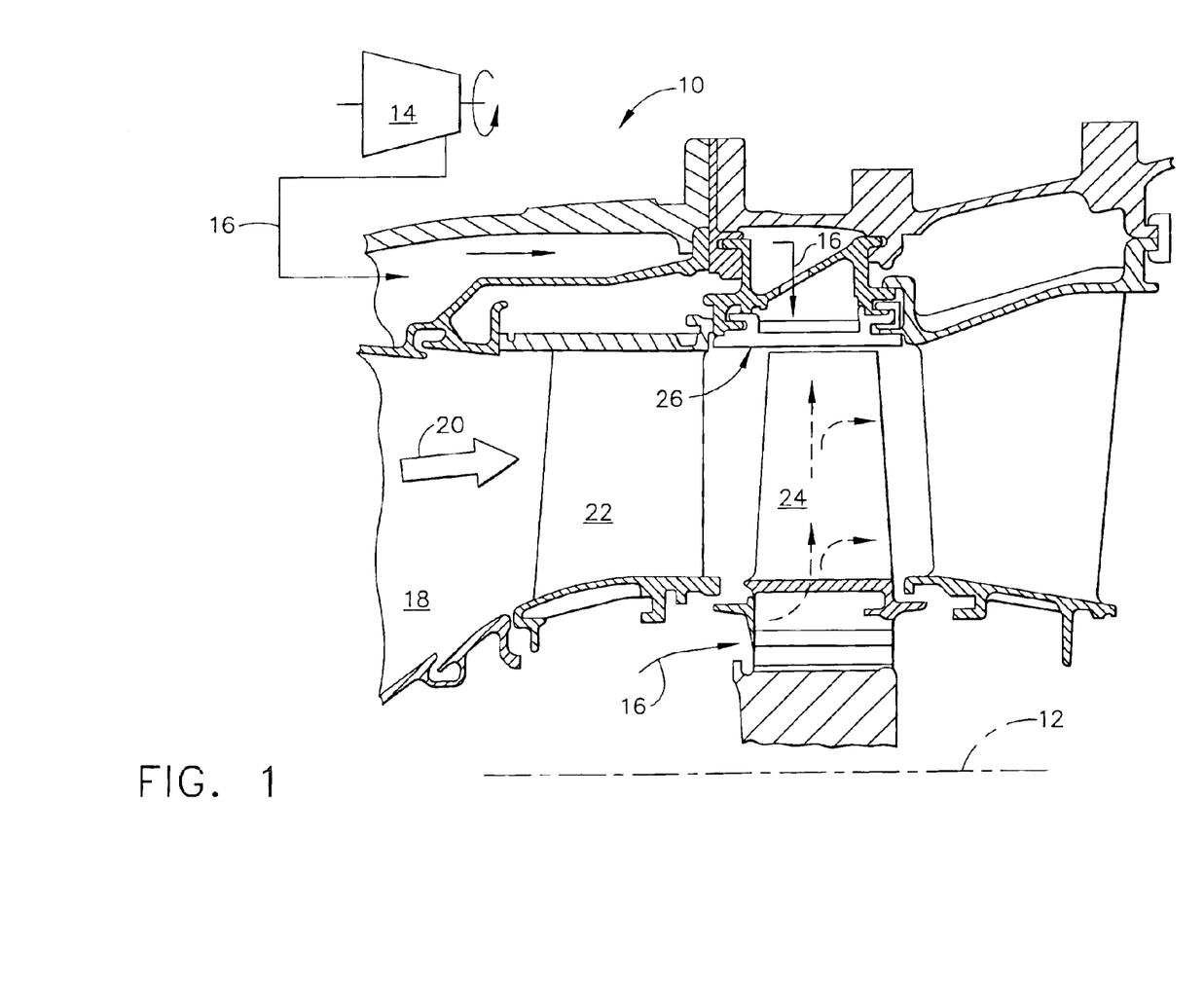
FIG. 1 is an axial sectional view of a portion of an exemplary gas turbine engine including a turbine shroud surrounding a row of turbine rotor blades.

Illustrated in FIG. 1 is a portion of a gas turbine engine 10 which is axisymmetrical about a longitudinal or axial centerline axis 12. The engine includes a multistage axial compressor 14 that pressurizes air 16 which is suitably channeled to an annular combustor 18, shown in aft part.

The air is mixed with fuel in the combustor and ignited for generating hot combustion gases 20 which are discharged therefrom between the stator vanes 22 of a high pressure turbine nozzle. The vanes guide the combustion gases through of row of high pressure turbine rotor blades 24 which extend radially outwardly from a supporting rotor disk that is joined in turn to the compressor for providing power thereto during operation.

Another turbine nozzle follows the first stage rotor blades 24 for further guiding the combustion gases downstream to a low pressure turbine (not shown) which extracts further energy for powering an upstream fan in a typical turbofan gas turbine engine application, or the low pressure turbine may be joined to an output drive shaft in a marine or industrial application.

As indicated above, the efficiency of the engine is related to the temperature of the combustion gases 20, yet high temperature of the combustion gases requires suitable protection of the various components subject to heating therefrom during operation. The combustor itself includes outer and inner liners which bound the combustion gases as they are formed, and the turbine nozzles include vanes and outer and inner bands along which the combustion gases flow.

The turbine rotor blades 24 are bathed in the hot combustion gases during operation, and are surrounded by a segmented turbine shroud 26 which bounds the combustion gases.

These various components are typically made from various forms of superalloy metals, typically nickel or cobalt based for modern gas turbine engines. These hot components are typically hollow and provided with suitable cooling circuits therein that receive the pressurized air 16 from the compressor which is used as a coolant in reducing their temperatures during operation.

These hot components may also be covered with suitable thermal barrier coatings for providing additional thermal insulation between their metallic substrate and the hot combustion gases which flow thereover during operation. As indicated above, it is desired to provide cooling of the thermal barrier coatings themselves for enhancing the performance thereof for protecting the metallic substrates from the hot combustion gases.

Figure 2:
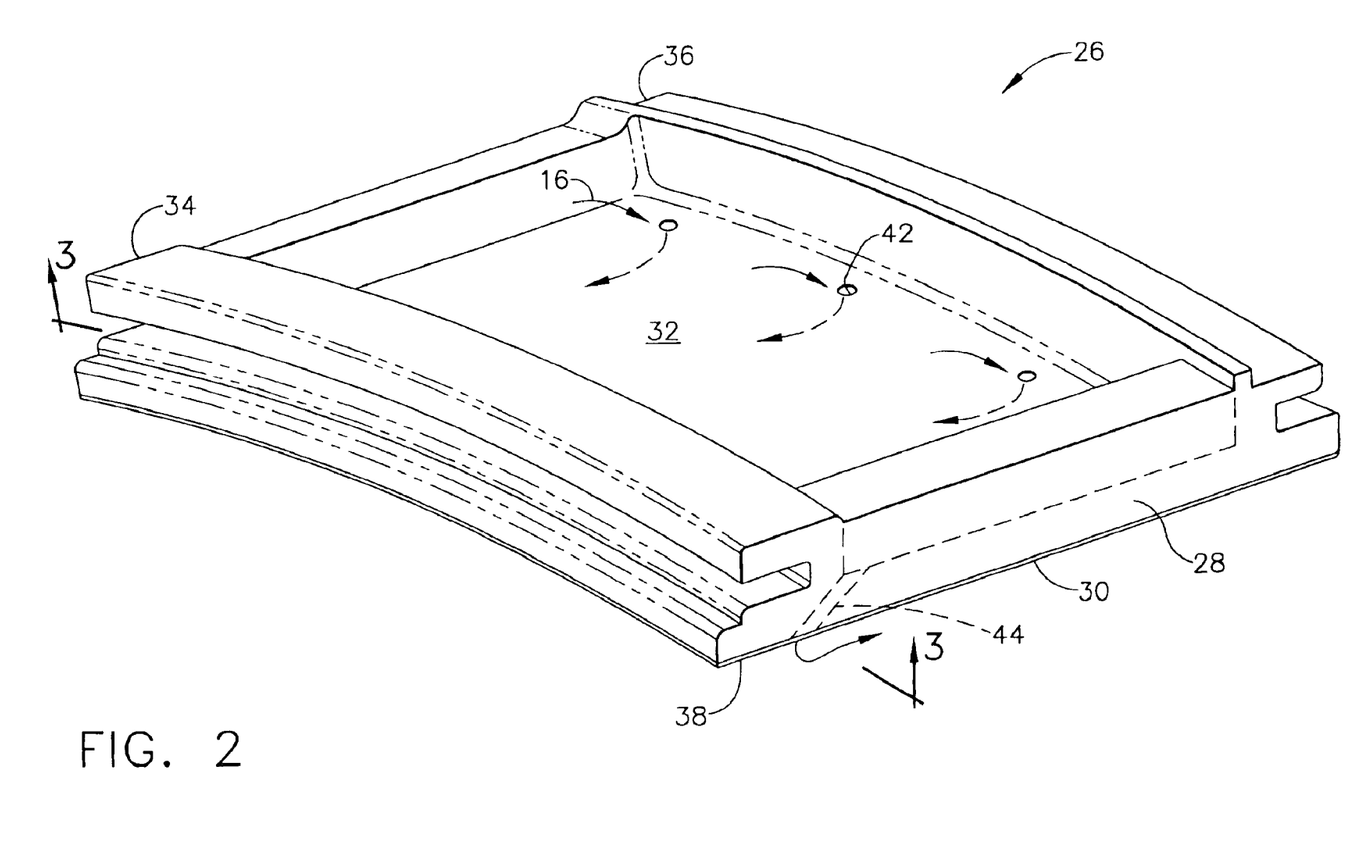
FIG. 2 is an isometric view of the one of the turbine shrouds illustrated in FIG. 1 in accordance with an exemplary embodiment.

An exemplary turbine component of the engine illustrated in FIG. 1 is the turbine shroud 26 which is illustrated in more detail in FIG. 2. The turbine shroud itself is arcuate in the circumferential direction, with a full complement of such turbine shrouds 26 being joined end to end to surround the full row of rotor blades. The shroud includes an arcuate substrate wall 28, which is typically formed of a suitable superalloy metal, such as nickel-based or cobalt-based superalloys.

The shroud wall 28 has a first or front surface 30 which faces or is exposed to the hot combustion gases during operation. The shroud also includes an opposite second or back surface 32 facing outwardly away from the combustion gases and over which the air coolant 16 is suitably channeled during operation. Typically, the coolant is impinged normally against the shroud back surface 32 for maximizing the cooling effect thereof.

In the exemplary shroud configuration illustrated in FIG. 2, the substrate wall 28 itself is relatively thin, about 2.5 mm for example, and further includes forward and aft hooks 34,36 extending radially outwardly from the shroud back surface 32. The hooks are suitably mounted in a hanger for supporting the row of turbine shrouds from an annular casing radially above the row of rotor blades 24 in a conventional configuration.

Figure 3:
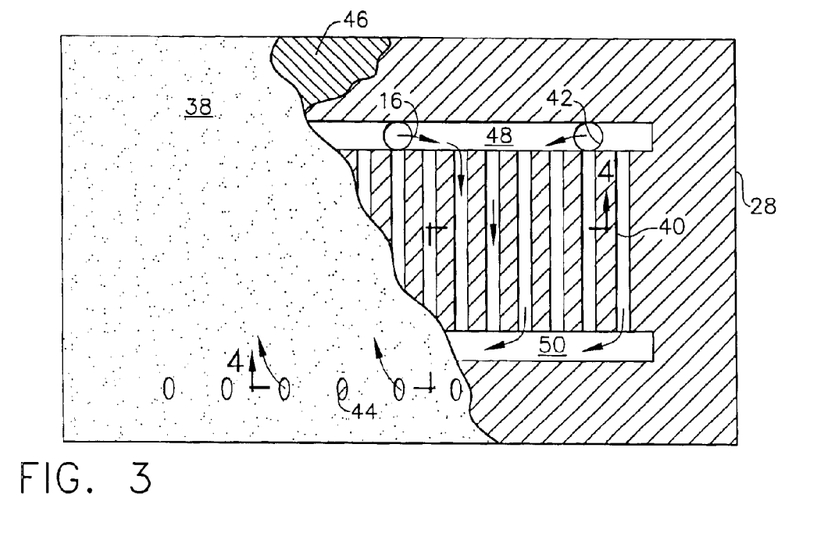
FIG. 3 is a plan view of the front surface of the shroud illustrated in FIG. 2 and taken generally along line 3—3.
Figure 4:
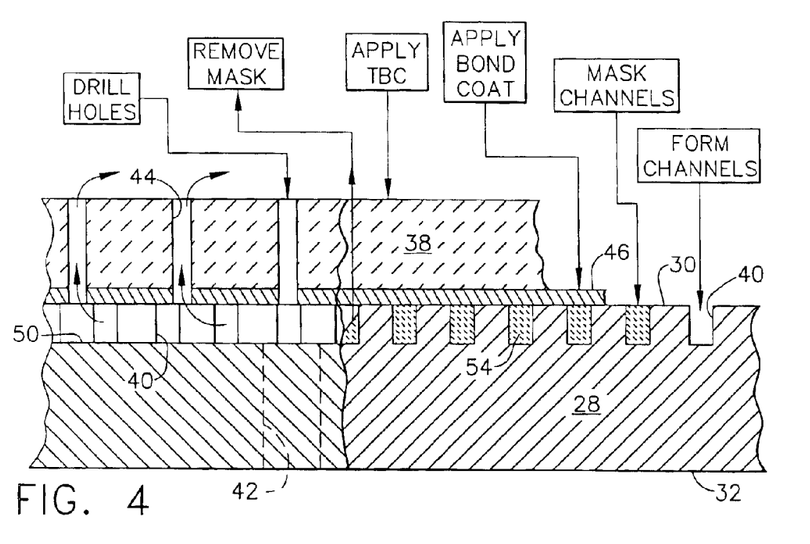
FIG. 4 is a radial sectional view through a portion of the shroud illustrated in FIG. 3 and taken along jog line 4—4, extending in part along a row of aperture outlets.

As shown in FIGS. 2 and 3, the front surface 30 of the shroud is entirely covered with a thermal barrier coating (TBC) 38 suitably affixed or bonded thereto. The thermal barrier coating is preferably a ceramic material of any conventional composition such as yttria stabilized zirconia which provides enhanced thermal insulation for the shroud. FIG. 4 additionally illustrates a transverse section through the turbine shroud of FIG. 3 in which the thermal barrier coating 38 is affixed to the front of the substrate wall 28.

Directly cooperating with the thermal barrier coating is a network or pattern of cooling flow channels 40 laminated or disposed in a common layer between the substrate wall 28 and the thermal barrier coating 38 itself.

As shown in FIGS. 2 and 3, the substrate wall further includes a plurality of aperture inlets 42 extending transversely or radially therethrough beginning from the back surface 32. And, a plurality or row of aperture outlets 44 extends transversely or radially through the thermal barrier coating 38. The inlets 42 and outlets 44 are disposed in flow communication with the network of flow channels 40 for delivering the air coolant 16 thereto and discharging the coolant therefrom.

In this way, the coolant 16 is first used for impingement cooling the back surface 32 of the turbine shroud illustrated in FIG. 2 and then enters the inlets 42 for flow through the network of flow channels 40 for then cooling the thermal barrier coating itself prior to discharge from the row of outlets 44.

As shown in FIGS. 3 and 4 the flow channels 40 extend parallel between the substrate wall and the coating 38 for cooling the interface therebetween. The inlets 42 and outlets 44 extend transversely or radially through the wall and coating, respectively. Although the transverse inlets and outlets provide local cooling in the immediate vicinity of the each aperture, they alone lack the ability to uniformly cool the interface between the substrate and the thermal barrier coating, provided instead by the network of flow channels.

As shown in FIG. 4, the turbine shrouds preferably include a metallic bond coat or layer 46 which is laminated between the substrate 28 and the thermal barrier coating 38 atop or over the network of flow channels 40. As indicated above, bond coats are conventional for providing a metallic bonding interface layer between the metallic substrate and the ceramic thermal barrier coating. They also provide oxidation resistance for the substrate.

Conventional bond coats include diffusion PtAl or an overlay of MCrAlX in the exemplary form of NiCrAlY or NiCoCrAlY, for example. Typical bond coats are applied relatively thin, on the order of a few mils, relative to the substantially thicker barrier coating.

In the preferred embodiment illustrated in FIGS. 3 and 4, the flow channels 40 are disposed directly in the substrate wall 28 by being suitably cast or machined therein. In this way, the network of channels 40 is formed in the shroud front surface 30 directly below the bond coat 46 which is suitably applied in a uniform and thin layer of a few mils over the entire front surface including the flow channels therein. In turn, a relatively thick and uniform thermal barrier coating 28 is suitably applied atop the bond coat 46 for completing the thermal barrier coating of the shroud.

In this way, the inlets 42 are sized for metering and controlling the flowrate of the inlet coolant to the flow channels 40. The coolant flows through the flow channels for directly cooling the interface between the thermal barrier coating and the substrate wall. Furthermore, the coolant in the flow channels provides additional thermal insulation for the metallic substrate itself and therefore provides yet additional thermal insulation from the hot combustion gases, in addition to the thermal insulation provided by the thermal barrier coating and the film cooling air flowing thereover.

It is also noted that the flow channels are located directly below the bond coat 46 and therefore additionally cool the bond coat which improves the ability of the bond coat to retain and support the thermal barrier coating thereatop.

Figure 5:
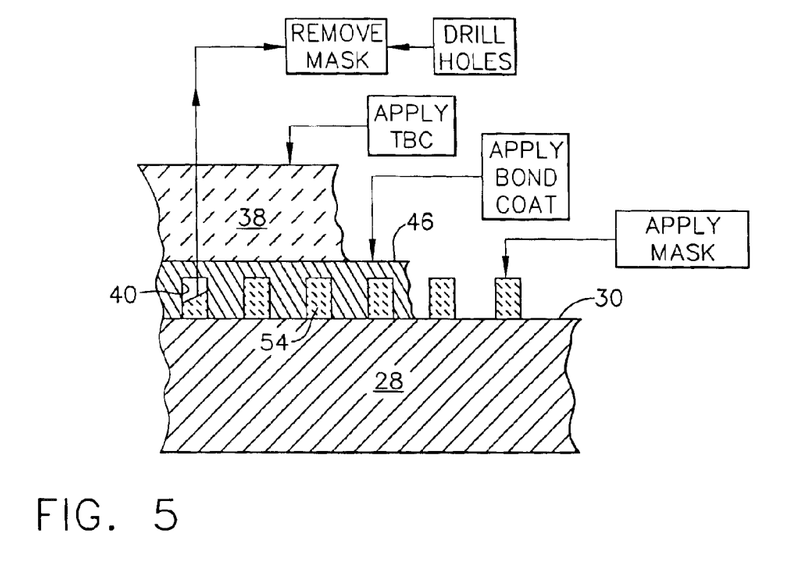
FIG. 5 is a radial sectional view, like FIG. 4, of the turbine shroud in accordance with another embodiment.

FIG. 5 illustrates an alternate embodiment of the flow channels 40 disposed between the substrate wall 28 and the thermal barrier coating 38. In this embodiment, the flow channels 40 are disposed in the bond coat 46 itself below the thermal barrier coating 38 and atop or over the substrate 28. In this embodiment, the bond coat 46 is substantially thicker than the conventional bond coat illustrated in FIG. 4 in order to provide sufficient space for introducing the flow channels 40 directly in the bond coat.

The dimensions of the flow channels 40 in either embodiment of FIGS. 4 and 5 may range from about 15 mils or 0.38 mm to about 60 mils or about 1.5 mm in square or rectangular profiles having generally U-shapes. The size of the flow channels should be small enough to fit within the relatively thin substrate wall, or within the bond coat. And, the flow channels should be large enough to minimize dust accumulation therein during operation for preventing their premature clogging over extended life in dusty operating environments.

Since the bond coat itself is metallic it provides inherent strength for covering the hollow flow channels, while additionally providing a continuous surface upon which the thermal barrier coating may be bonded. The metallic bond coat therefore seals the network of flow channels for preventing leakage of the cooling air therefrom into the ceramic thermal barrier coating, with the cooling air from the flow channels being discharged solely through the outlets 44 specifically provided therefor.

The network of flow channels 40 may have any suitable configuration and surface area as desired for suitably cooling the thermal barrier coating on the intended turbine components. For the exemplary turbine shroud components illustrated in FIG. 3, the network of flow channels includes those dedicated as inlet and outlet headers 48,50, with the remaining flow channels 40 defining cross channels extending between the headers for carrying cooling flow therebetween in parallel.

For example, in the embodiment illustrated in FIG. 3 the cross channels 40 extend transversely between the inlet and outlet headers 48,50. The cross channels 40 are preferably straight and extend directly from the inlet header 48 directly to the outlet header 50, and all operate in unison or parallel flow for channeling the coolant axially along the turbine shroud from its trailing edge at the aft hook to the leading edge at the forward hook.

Figure 6:
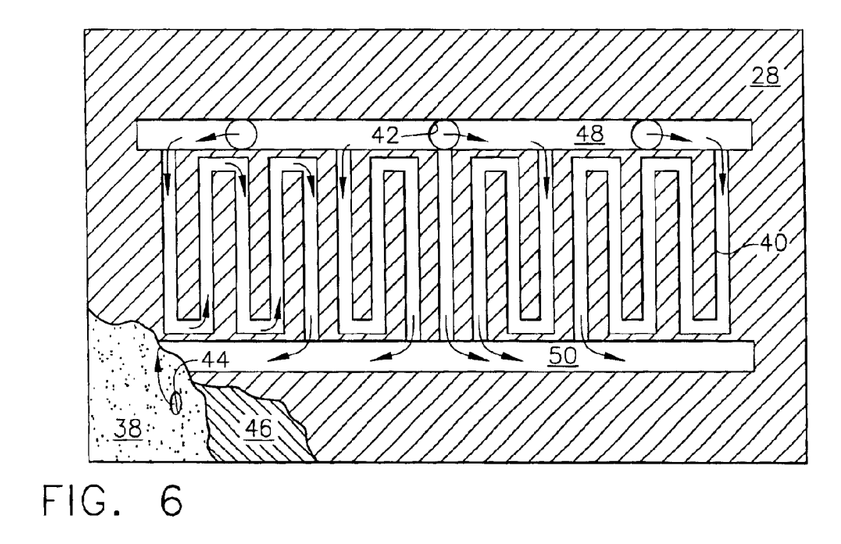
FIG. 6 is a front plan view of the turbine shroud, like FIG. 3, in accordance with another embodiment.

FIG. 6 illustrates a modification of the FIG. 3 embodiment in which the cross channels 40 are arranged in multiple serpentine legs axially between the inlet and outlet headers 48,50. In the exemplary configuration illustrated, the cross channels define a five-pass serpentine channel at both circumferential ends of the turbine shroud, and then corresponding three-pass serpentine channels inboard therefrom, with a single flow channel disposed symmetrically therebetween and extending directly between the inlet and outlet headers.

In the embodiments illustrated in FIGS. 3 and 6, the flow channels extend generally parallel to each other along the axial direction of the turbine shroud and generally transverse or perpendicular to the circumferentially extending headers 48,50.

Figure 7:
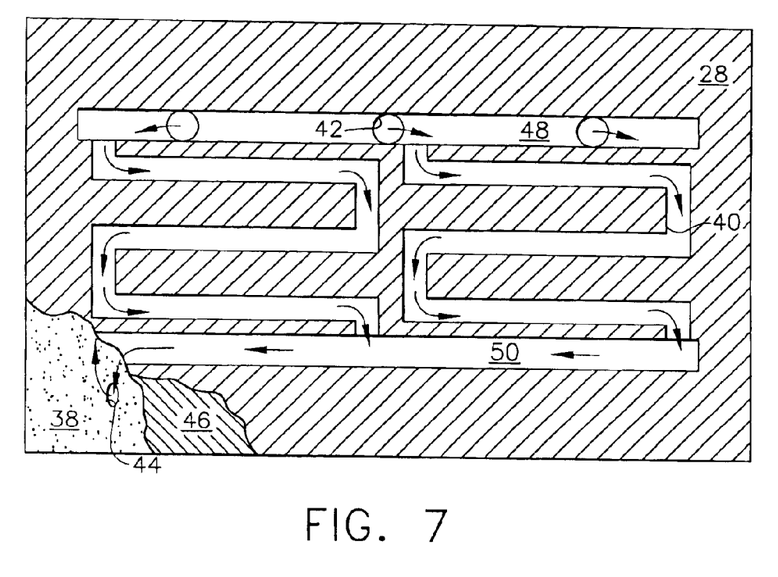
FIG. 7 is a front plan view of the turbine shroud, like FIG. 3, in accordance with another embodiment.

FIG. 7 illustrates yet another alternate embodiment in which the cross channels 40 extend primarily parallel with the inlet and outlet headers 48,50 along the circumferential direction of the turbine shroud. Yet again, the cross channels 40 in this embodiment may be arranged in multiple serpentine legs between the two headers, with two three-pass serpentine configurations being illustrated for example.

In the several embodiments illustrated in FIGS. 3, 6, and 7, the inlet header 48 and the inlets 42 therein are disposed adjacent the aft hook 36 shown in FIG. 2, with the outlet header 50 and the outlets 44 being disposed at the opposite, forward end of the shroud adjacent the forward hook 34. In this way, the spent impingement air is first used to cool the back surface 32 of the turbine shroud illustrated in FIG. 2 and then flows through the row of inlets 42 adjacent the aft hook 36.

The coolant then flows through the flow channels forwardly inside the turbine shroud for discharge from the row of outlets 44 located below the forward hook 34 through the thermal barrier coating. In this way, the discharged coolant then flows downstream over the thermal barrier coating to provide a thermally insulating film or layer of air for further protection thereof from the hot combustion gases.

Figure 8:
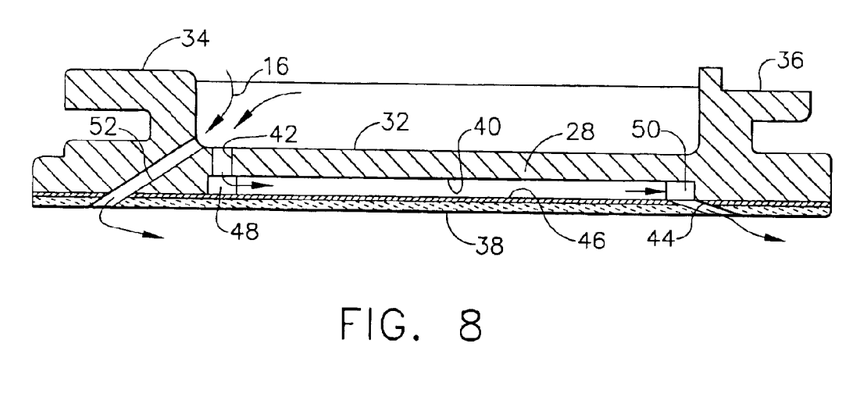
FIG. 8 is an axial sectional view of the turbine shroud illustrated in FIG. 2 in accordance with another embodiment.

Illustrated in FIG. 8 is yet another embodiment of the turbine shroud which may include the various configurations of the network of channels 40 illustrated in FIGS. 3–7, but modified for reversing the direction of coolant flow. In this embodiment, the inlet header 48 and the inlets 42 are disposed adjacent to the forward hook 34 of the shroud, and the outlet header 50 and outlets 44 are disposed at the opposite aft end of the shroud adjacent the aft hook 36.

The coolant 16 therefore flows from the upstream, forward end of the turbine shroud through the flow channels between the substrate wall and the thermal barrier coating, and is discharged at the aft end of the turbine shroud. In this embodiment, an additional row of conventional film cooling holes 52 may be provided through the base of the forward hook 34 for channeling another portion of the coolant 16 from the back surface 32 of the turbine shroud for discharge through the thermal barrier coating along the forward or leading edge of the turbine shroud. The air discharged from the film cooling holes 52 may then be used for establishing the thermally insulating film of cooling air extending aft or downstream over the thermal barrier coating.

FIG. 4 illustrates in flowchart form an exemplary method of making the cooled turbine shroud having the flow channels formed in the metal substrate. More specifically, the metallic portion of the turbine shroud may be formed in any conventional manner such as casting or machining, with the network of flow channels 40 being suitably formed by casting or machining in the front surface 30 of the substrate wall 28.

The network of flow channels 40 is then suitably masked by filling the flow channels with a suitable masking material 54 which can withstand the high temperature process in which the bond coat and thermal barrier coating are applied. A suitable mask 54 may include various compounds such as NaCl, MgO, $TiO_2$, $Al_2O_3$, or $Y_2O_3$ for example.

The bond coat 46 may then be applied in a conventional manner such as high temperature spraying over the substrate front surface 30 and over the masked channels 40 filled flush with the masking compound 54. Next, the thermal barrier coating 38 may then be applied in any conventional manner such as high temperature spraying over the previously applied bond coat 46. The thermal barrier coating is typically thicker than the bond coat and may have any suitable thicknesses as desired.

The mask 54 may then be suitably removed from the flow channels 40 by leaching or washing away thereof using a suitable caustic solvent, such as KOH. Since the inlet apertures 42 may be preformed or predrilled in the turbine shroud prior to the application of the bond coat and thermal barrier coating and mask, those apertures may be used for removing the mask after the shroud is coated.

The outlet apertures 44 may be suitably drilled by laser or electrical discharge machining (EDM), for example, through the thermal barrier coating and bond coat to reach the outlet header 50 for establishing flow communication therewith. If desired, the mask removal may be conducted after the outlet apertures 44 are formed for improving the ability to flush or leach the masking compounds completely from the now hidden flow channels 40.

FIG. 5 illustrates a modification of the method of making the turbine shroud in which the metallic shroud itself is conventionally formed without the flow channels therein. In this embodiment, the substrate front surface is masked at a plurality of locations corresponding with the intended network of flow channels 40. The mask 54 may have a suitably viscous or putty-like consistency, and may be applied in the form of tapes for achieving the desired shape and size for the subsequent flow channels.

The bond coat 46 may then be conventionally applied over the front surface 30 of the substrate as well as over the masked locations. The bond layer is typically applied in layers to fill the spaces between the masked locations and then completely cover the network of masked locations to a suitable thickness, which is substantially thicker than conventionally applied bond coats.

The thermal barrier coating 38 may then be conventionally applied over the previously applied bond coat 46 in suitable thickness atop the bond coat.

The mask 54 is then suitably removed by leaching or flushing from within the bond coat 46 for leaving therebehind the open flow channels 40 therein. As indicated above, the inlet apertures 42 may be preformed in the substrate wall 28 for permitting removal of the mask later in the process.

The outlet apertures 44 may then be suitably drilled through the thermal barrier coating and bond coat for establishing flow communication with the outlet header 50.

In FIG. 5, the network of flow channels 40 is formed solely within the metallic bond coat 46 and provides direct cooling thereof, and cooling of the interface region between the thermal barrier coating 38 and the metallic substrate 28.

In the FIG. 4 embodiment, the flow channels 40 are formed in the front surface 30 of the metallic substrate 28 and therefore cool the thin bond coat 46 and thermal barrier coating 38 in turn therefrom.

In both embodiments illustrated in FIGS. 4 and 5, the coolant air is better used for cooling the bond coat and the thermal barrier coating for improving their thermal insulation performance and introducing yet another mechanism for cooling thereof independent of the conduction cooling of the coating and bond coat inwardly through the metallic substrate 28.

The so cooled thermal barrier coating in the various embodiments disclosed above can significantly lower the temperature thereof as well as the temperature of the bond coat, and therefore improves the thermally insulating performance of the coating while improving the life thereof.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which we claim:

1. A turbine shroud comprising:
   an arcuate substrate wall having front and back surface, forward and aft hooks extending from said back surface, and a plurality of aperture inlets extending therethrough;
   a thermal barrier coating bonded to said wall front surface;
   a network of flow channels extending parallel between said wall and coating for carrying an air coolant therethrough, and including an inlet header disposed in flow communication with said inlets, and an outlet header spaced from said inlet header; and
   a plurality of aperture outlets extending through said coating in flow communication with said outlet header for discharging said coolant.

2. A shroud according to claim 1 wherein said inlets are sized to meter flow to said flow channels.

3. A shroud according to claim 2 further comprising a bond coat laminated between said substrate wall and coating, and atop said flow channels for sealing said flow channels to discharge said coolant solely through said outlets.

4. A shroud according to claim 3 wherein said network further comprises a row of cross channels extending between said inlet and outlet headers.

5. A shroud according to claim 4 wherein said cross channels extend transversely between said inlet and outlet headers.

6. A shroud according to claim 5 wherein said cross channels are straight from said inlet header to said outlet header.

7. A shroud according to claim 5 wherein said cross channels are arranged in multiple serpentine legs between said inlet and outlet headers.

8. A shroud according to claim 4 wherein said cross channels extend parallel with said inlet and outlet headers in multiple serpentine legs therebetween.

9. A shroud according to claim 4 wherein said channels are disposed in said substrate below said bond coat.

10. A shroud according to claim 4 wherein said channels are disposed in said bond coat below said coating and atop said substrate.

11. A gas turbine engine wall comprising:
    a metal substrate having front and back surfaces, and an aperture inlet extending therethrough;
    a thermal barrier coating bonded atop said front surface;
    a network of flow channels laminated between said substrate and coating for carrying an air coolant therebetween, and including an inlet header disposed in flow communication with said inlet, and an outlet header spaced from said inlet header; and
    a plurality of aperture outlets extending through said coating in flow communication with said outlet header for discharging said coolant.

12. A wall according to claim 11 wherein said channels extend parallel between said substrate and coating, and said inlet and outlets extend transversely therethrough.

13. A wall according to claim 12 further comprising a bond coat laminated between said substrate and coating, and atop said flow channels for sealing said flow channels to discharge said coolant solely through said outlets.

14. A wall according to claim 13 wherein said channels are disposed in said substrate below said bond coat.

15. A wall according to claim 13 wherein said channels are disposed in said bond coat below said coating and atop said substrate.

16. A wall according to claim 13 wherein said network further comprises a row of cross channels extending between said inlet and outlet headers.

17. A wall according to claim 16 wherein said cross channels extend transversely between said inlet and outlet headers.

18. A wall according to claim 17 wherein said cross channels are straight from said inlet header to said outlet header.

19. A wall according to claim 17 wherein said cross channels are arranged in multiple serpentine legs between said inlet and outlet headers.

20. A wall according to claim 16 wherein said cross channels extend parallel with said inlet and outlet headers.

21. A wall according to claim 20 wherein said cross channels are arranged in multiple serpentine legs between said inlet and outlet headers.

22. A wall according to claim 16 comprising an arcuate turbine shroud having forward and aft hooks extending outwardly from said substrate back surface for supporting said shroud above a row of rotor blades in a gas turbine engine.

23. A turbine shroud according to claim 22 wherein said inlet header is disposed adjacent said aft hook, and said outlet header disposed adjacent said forward hook.

24. A turbine shroud according to claim 22 wherein said inlet header is disposed adjacent said forward hook, and said outlet header is disposed adjacent said aft hook.

25. A turbine shroud according to claim 22 further comprising a row of film cooling holes extending through said substrate and thermal barrier coating at said forward hook for discharging another portion of said coolant from said back surface for film cooling said thermal barrier coating.

26. A method of making said wall according to claim 16 comprising:
    forming said channels in said substrate front surface;
    masking said channels;
    applying said bond coat over said substrate front surface and masked channels;
    applying said thermal barrier coating over said bond coat;
    removing said mask from said channels; and
    drilling said outlets through said coating and bond coat in flow communication with said outlet header.

27. A method of making said wall according to claim 16 comprising:
    masking said substrate front surface at a plurality of locations corresponding with said flow channels;
    applying said bond coat over said substrate front surface and said masked locations;
    applying said thermal barrier coating over said bond coat;
    removing said mask from said bond coat; and
    drilling said outlets through said coating and bond coat in flow communication with said outlet header.

* * * * *